Feb. 14, 1928.
L. A. MAPEL
1,658,930
FITTING FOR INDICATING DEVICES
Filed Nov. 21, 1921
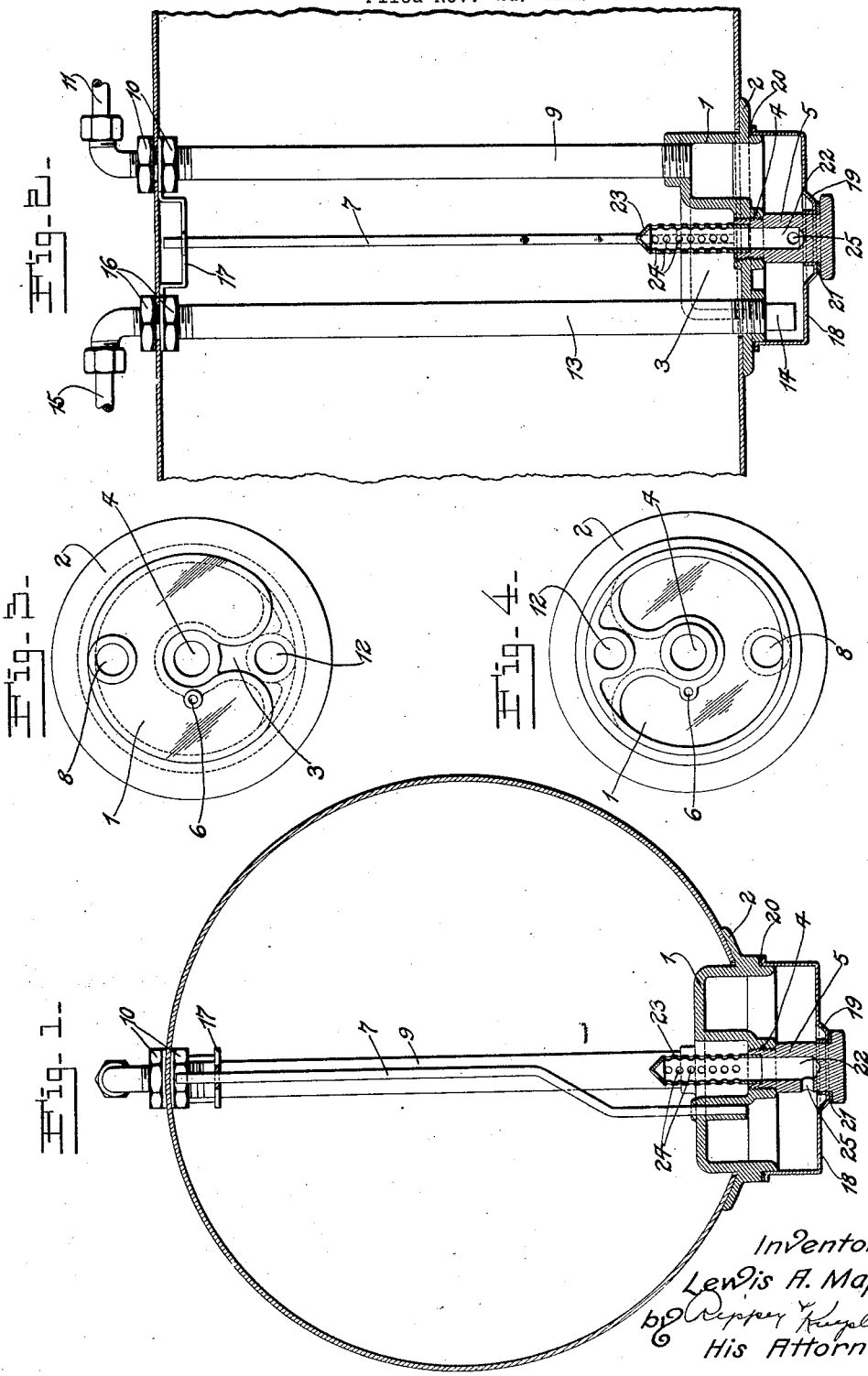
Inventor.
Lewis A. Mapel,
by Copper y Keyland
His Attorneys.

Patented Feb. 14, 1928.

1,658,930

UNITED STATES PATENT OFFICE.

LEWIS A. MAPEL, OF ST. LOUIS, MISSOURI, ASSIGNOR TO THE AUTOMATIC APPLIANCE COMPANY, OF ST. LOUIS, MISSOURI, A CORPORATION OF MISSOURI.

FITTING FOR INDICATING DEVICES.

Application filed November 21, 1921. Serial No. 516,833.

This invention relates to a fitting for fluid indicating devices and has special reference to tank fittings for such devices.

The present invention is a carrying forward of the construction disclosed in my prior application Serial No. 476,333, filed June 9, 1921; and an object of this invention is to improve generally the construction and arrangement of the parts and elements embodied therein.

Another object of the invention is to locate various members of the device within the tank and out of the way of all danger of injury; and by so locating these members to obtain freedom from injury a very substantial amount of strength is added to the tank.

Another object of the invention is to provide equipment of the character mentioned, which may be utilized for draining the tank and which may be opened up and exposed for cleaning or other desired purposes.

A further object of the invention is to use certain parts thereof to displace and perform the functions of certain auxiliary parts which usually form a part of the fuel tank equipment, viz, the sump, various parts of the fuel elevating system, the drain plug and its retaining flange.

Various other objects and advantages and additional particulars in which the present invention is an improvement upon that disclosed in my said companion application, will appear from the following description, reference being made to the drawing, in which Fig. 1 is a vertical transverse sectional view of a tank having the present invention in connection therewith.

Fig. 2 is a vertical sectional view taken approximately at right angles to the plane of the section of Fig. 1.

Fig. 3 is a plan view of the fitting member which is attached to the tank.

Fig. 4 is a bottom plan view of the body of the fitting member.

In the form of the invention shown the fitting member comprises a body 1 having a surrounding flange 2 attached to the wall of the tank around the hole in which the body 1 is located. Due to the strength of the fitting the tank is strengthened by its presence, instead of being weakened.

The body 1 of the fitting extends a proper distance upwardly into the tank and has an opening or drain passage 3 near the inner end of which a threaded hole 4 is formed for receiving the threaded end of a plug 5. A hole 6 is formed through the top wall of the body 1 for receiving the lower end of the atmosphere tube 7. The lower end of the tube 7 is approximately in the same plane as the bottom of the tank to which the device is applied; while the upper end of said tube is within the tank and near the top wall thereof. The tube 7 is open throughout its length, and is a permanent part of the fitting to which it is connected.

A hole 8 is formed through the top of the body 1 and receives the lower end of a pipe 9. The lower end of the pipe 9 is somewhat above the plane of the lower end of the tube 7, in the construction shown being at or near the inner surface of the upper wall of the body 1 of the fitting. The pipe 9 is open throughout its entire length and is of such diameter that liquid cannot be retained therein by surface tension. The upper end of the pipe 9 extends through an opening in the upper wall of the tank and is secured by two or more sealed lock nuts 10. A tube 11 having communication with the upper end of the pipe 9 leads to an indicating device (not shown).

A hole 12 in the lower wall of the body 1 of the fitting receives a threaded portion on the pipe 13 some distance above the lower end thereof. Below the threaded portion of said pipe 13 an extension 14 of said pipe projects to a point a slight distance above the bottom of the chamber of which the fitting is a part. The pipe 13 is open throughout its length. The upper end of said pipe 13 extends through an opening in the upper wall of the tank and is in communication with a tube 15, forming a part of the fuel elevating or feeding system. Sealed lock nuts 16 secure the upper end of the pipe 13 to the tank. The lock nuts 16 are adjusted on the pipe 13 to allow the body member to be properly engaged with the tank during assembly. It will thus be seen that pipes 9 and 13 and the lock nuts 10 and 16, therefor, aid in sustaining the casing.

The lower ends of the holes 6 and 12 in the body of the fitting 1, into which the tube 7 and the pipe 13 fit, are out of communication with the space above the fluid level in the fitting.

A bracket 17 having holes therein through which the pipes 9 and 13 extend is secured in place by the lock nuts 10 and 16. Said bracket has a hole therein receiving the upper end of the tube 7.

As stated, the body 1 of the fitting forms a part of a compression chamber. The other part 18 of said chamber encircles the lower extremity of the body 1 and has a hole through a central embossed portion 19 through which the plug 5 extends to support the part 18. A gasket 20 compressed between the adjacent portions of the two members of the chamber forms a seal at that point; while a gasket 21 compressed between the head of the plug 5 and the embossed portion 19, forms a seal at that point. Leakage is effectively prevented by this construction.

The plug 5 has a passage 22 therein in the upper portion of which a filter 23 is fitted. The holes 24 of the filter are somewhat smaller than the opening 25 from the lower end of the passage 22. The hole 25 is constricted with respect to the hole through the pipe 13.

The fluid entering the fitting chamber through the filter 23 rises to the level of the lower end of the tube 7, at which level the pressure of the trapped air prevents further rise of the fluid within the fitting chamber. The pressure of the air through the pipe 9 and the communicating tube 11 is communicated to an indicating device in the manner disclosed in my co-pending application. The indicating device, as there disclosed, is responsive to the pressure of the air thus obtained, and affords constant and accurate information as to the amount of fluid in the tank at any and all times.

It is evident from the foregoing description that the construction shown allows the interior of the chamber to be exposed to atmosphere. This is accomplished because, as fuel is drawn off faster than it flows into the chamber, the level of fluid therein drops, thereby uncovering the lower end of the tube 7. This uncovering allows the fluid which has sought the same level therein as the level of the fluid in the tank, to drop out. Thus when the fluid in the tube 7 has dropped out, it is evident that the chamber is exposed to atmosphere.

I claim:—

1. An attachment for a fuel tank having top and bottom openings, comprising, a casing insertible through and adapted to fit the opening in the bottom of the tank and closed at the top and adapted to form a pressure chamber, and a pipe exsertible through the opening in the top of the tank and connected with said casing, said casing having a fuel inlet port to the pressure chamber.

2. An attachment for a fuel tank having top and bottom openings, comprising, a casing insertible through and adapted to fit the opening in the bottom of the tank and closed at the top and adapted to form a pressure chamber, said casing having a fuel inlet port to said chamber, a pipe rising from said casing and exsertible through the opening in the top of the tank, and means for connecting said pipe to the top of the tank adapted to aid in sustaining said casing.

3. An attachment for a fuel tank having top and bottom openings, comprising, a casing insertible through and adapted to fit the opening in the bottom of the tank and closed at the top and adapted to form a pressure chamber, said casing having a fuel inlet port to said chamber, pipes rising from said casing and exsertible through the opening in the top of the tank, and means for connecting said pipes to the top of the tank adapted to aid in sustaining said casing, said pipes opening respectively to the top and bottom of said chamber.

4. An attachment for a fuel tank having top and bottom openings, comprising, a casing insertible through and adapted to fit the opening in the bottom of the tank and closed at the top and adapted to form a pressure chamber, said casing having a fuel inlet port to said chamber, a pipe rising from said casing and exsertible through the opening in the top of the tank, means for connecting said pipe to the top of the tank adapted to aid in sustaining said casing, and an atmospheric pressure pipe rising from the interior of said casing to the top of the tank.

5. An attachment for a fuel tank having top and bottom openings, comprising, a casing insertible through and adapted to fit the opening in the bottom of the tank and closed at the top and adapted to form a pressure chamber, said casing having a fuel inlet port to said chamber, pipes rising from the interior of said casing and exsertible through the opening in the top of the tank, means for connecting said pipes to the top of the tank adapted to aid in sustaining said casing, and an atmospheric pressure pipe rising between said first pipes from the interior of said casing to the top of the tank.

6. An attachment for a fuel tank having top and bottom openings, comprising, a casing insertible through and adapted to fit the opening in the bottom of the tank and closed at the top and adapted to form a pressure chamber, said casing having a fuel inlet port to said chamber, pipes rising from said casing and exsertible through the opening in the top of the tank, means for connecting said pipes to the top of the tank adapted to aid in sustaining said casing, said pipes opening respectively to the top and bottom of said chamber, and an atmospheric pressure pipe rising from said casing and opening to the chamber therein, at a point spaced from the bottom thereof.

7. An attachment for a fuel tank having top and bottom openings, a casing insertible through and adapted to fit the opening in the bottom of the tank and closed at the top and adapted to form a pressure chamber, said casing having a fuel inlet port to said chamber, a pressure pipe rising from the interior of said casing and exsertible through the opening in the top of the tank, and an atmosphere pipe rising from the interior of said casing.

8. An attachment for a fuel tank having top and bottom openings, a casing insertible through and adapted to fit the opening in the bottom of the tank and closed at the top and adapted to form a pressure chamber, said casing having a fuel inlet port to said chamber, a pressure pipe and a suction pipe rising from the interior of said casing and exsertible through the opening in the top of the tank, and an atmosphere pipe rising from the interior of said casing at a point above the lower end of said suction pipe.

LEWIS A. MAPEL.